Dec. 10, 1963  J. P. FAY  3,114,062
ANISOTROPIC BRUSH
Filed Feb. 1, 1960

INVENTOR.
James P. Fay
BY
Johnson and Kline
ATTORNEYS 3,114,062
ANISOTROPIC BRUSH
James P. Fay, Norwalk, Conn., assignor to The Teletrak Corporation, Wilmington, Del., a corporation of Delaware
Filed Feb. 1, 1960, Ser. No. 5,907
9 Claims. (Cl. 310—253)

The present invention relates to a brush construction for use on commutators and more particularly to a brush for use in commutators on motors or the like electrical devices.

It is an object of the present invention to provide a brush which will readily conduct electric current to and from a commutator means and which will reduce sparking at the commutator face, particularly when bridging the gap between commutator segments, and which will provide a highly efficient heat transfer for transferring the heat, particularly at the interface between the brush and commutator, away from said commutator to be dissipated therefrom so as to prolong the life of the commutator and brush and to produce an effective electrical connection having a long life.

This is accomplished according to the present invention by forming the brush from an anisotropic material and more particularly an anisotropic polycrystalline graphite having a highly-oriented crystal-lattice structure and arranged in a manner that it has a low electrical and heat resistance on an axis extending from the commutator-engaging face to the other end of the brush and the electrical connection thereto, and which has a high electrical resistance and heat resistance on an axis extending from side to side of the brush in the direction of movement of the brush over the commutator segments wherein the brush may be in bridging relation between the segments. The brush also has a low electrical and heat resistance along an axis extending from front to back of the brush.

While the invention may be used in any system wherein a brush engages and is movable relative to the commutator strip having a plurality of insulated commutator segments provided with gaps therebetween as in switching, sensing or the like devices, it is particularly useful in electrical motors or the like devices having commutators rotatable with respect to brushes carried by the motor as it enables the current to be efficiently and readily conducted to and from the commutator and the coils connected thereto while at the same time presenting a high resistance path across the gap with the brush in bridging relation with adjacent segments, thus greatly reducing sparking thereat with resultant longer life of the brushes and less damage to the commutator. Also, because of the fact that the brush has a low resistance to the transmission of heat along the axis extending from the commutator, the heat generated by the brush contact with the commutator and heat in the commutator means itself will be readily conducted away and dissipated.

Other features and advantages of the invention will be apparent from the specification and claims when considered in connection with the accompanying drawings in which:

Figure 1:
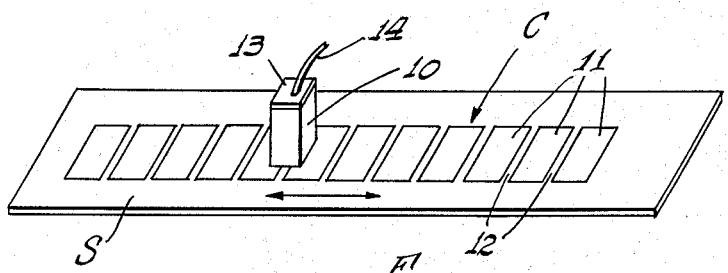
FIGURE 1 shows a brush adapted to be moved relative to a plurality of commutator or switch segments.

As shown in the drawings, a brush 10 of the present invention is employed in a commutator or commutator type switch means C in which the brush is moved relative to a plurality of insulated commutator segments 11 preferably which are separated by gaps 12 having a width less than the width of the brush and in which the brush in moving from segment to segment bridges the gap therebetween.

Figure 3:
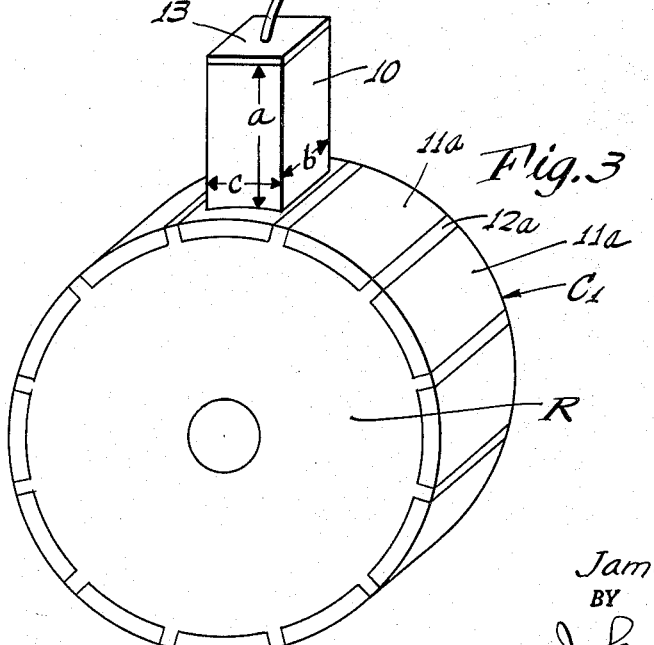
FIG. 3 is an enlarged detail view of the commutator and brush.

The brush of the present invention is formed of an anisotropic material. One such material is polycrystalline form of graphite having highly-oriented crystal-lattice structure which provides a difference in characteristics according to different axes of the brush. Pyrographite, a product of Raytheon Corporation of Lawrence, Massachusetts, is an example of this material. The crystals of the graphite are so arranged in the brush that the brush has a low electrical resistance and a low resistance to the transmission of heat along the longitudinal axis $a$ of the brush as shown in FIG. 3. It also has a low electrical resistance and low resistance to heat transfer from the front to the back of the brush along the axis $b$ but has a high electrical resistance and resistance to heat transfer along the axis from side to side of the brush as indicated by $c$. It will be appreciated that this provides an ideal structure for a brush as used herein in that it permits ready transmission of current along the $a$ axis from a source to the commutator surface and permits the transmission of heat, as generated by the friction of the brush against the commutator, away from the commutator along the axis $a$. However, it has a high resistance to the passage of electrical current and of heat transversely of the brush from side to side thereof along axis $c$ which extends in the bridging direction and forms a high resistance shunt across the gap so that sparking is substantially eliminated as the brush moves from commutator segment to commutator segment and where said commutator segments have different potentials impressed thereon.

In order to facilitate the feeding of current to and from the brush, the end of the brush may be capped with a metal cap 13 which serves as a collector means for receiving or distributing the current passing along the brush in the $a$ axis and to which the lead 14 is secured. The ease with which the current is transmitted front and back along the $b$ axis tends to assist in the distribution of the current feeding to the motor or being removed therefrom as in the case of a generator or other device. The brush, for example, may be used in connection with a flat commutator strip, as shown in FIG. 1, in which the brush 10 is moved relative to the commutator segments 11 on the strip S in the direction of the arrows. This may be used as a commutator or a switching means wherein the brush is employed to sense a plurality of circuits. Also, it has particular use, as shown in FIG. 2, in connection with a motor or generator of the type having a wound rotor R in which the coils of the rotor are connected to commutator segments 11a of a commutator C1 which are separated by gap 12a which commutator is rotatable with the rotor and in which the brushes 10 are carried in suitable brush holders (not shown) and mounted to cooperate with the rotating commutator to feed current to or to remove current from the rotor.

Figure 2:
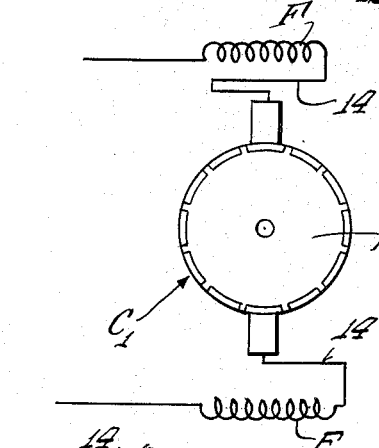
FIG. 2 shows the brush used in a motor employing a commutator.

In the form of the invention shown in FIG. 2, the motor is a series wound motor in which the fields F are series connected to the coils of the rotor by means of the brushes cooperating with the commutator.

Variations and modifications may be made within the scope of the claims and portions of the improvements may be used without others.

I claim:

1. A brush adapted to move relative to a commutator having a plurality of insulated commutator segments of predetermined width separated by a gap of a width less than the width of the brush, comprising a body of solely anisotropic material having low electrical and heat resistance along an axis perpendicular to the commutator-engaging face of the brush and along an axis extending from front to back of said brush and a high electrical and heat resistance along an axis extending from side to side in gap bridging direction.

2. A brush adapted to move relative to a commutator having a plurality of insulated commutator segments of predetermined width separated by a gap of a width less than the width of the brush, comprising a body of solely anisotropic polycrystalline graphite having a highly-oriented crystal-lattice structure providing low electrical and heat resistance along an axis perpendicular to the commutator-engaging face of the brush and a high electrical and heat resistance along an axis extending from side to side in gap bridging direction.

3. A brush adapted to move relative to a commutator having a plurality of insulated commutator segments separated by a gap of a width less than the width of the brush, comprising a body of solely anisotropic graphite material having low electrical resistance along an axis perpendicular to the commutator-engaging face of the brush and a high electrical resistance along an axis perpendicular to said first axis and extending in the direction of movement of the brush over the commutator segments.

4. A brush adapted to move relative to a commutator having a plurality of insulated commutator segments of predetermined width separated by a gap of a width less than the width of the brush, comprising a body of anisotropic polycrystalline graphite having a highly-oriented crystal-lattice structure providing low electrical and heat resistance along an axis perpendicular to the commutator-engaging face of the brush and along an axis extending from front to back of said brush and a high electrical and heat resistance along an axis extending from side to side in gap bridging direction.

5. A brush for use in a switch means having a plurality of insulated segments separated by gaps of a width less than the width of the brush, said brush being in engagement with and movable relative to said segments and comprising a body of anisotropic material due to the crystalline structure thereof having low electrical and heat resistance along an axis perpendicular to the segment-engaging face of the brush to facilitate passage of current to and from the segments, and a high electrical and heat resistance along an axis extending in the direction of movement of the brush over the segments and forming a high resistance shunt between the segments when the brush is in gap bridging position whereby sparking therebetween is reduced.

6. A switching means having a plurality of insulated segments separated by gaps of a width less than the width of a brush in engagement with and movable relative to said segments, said brush comprising a body of anisotropic graphite due to the crystalline structure thereof having low electrical resistance along an axis perpendicular to the segment-engaging face of the brush to facilitate passage of current to and from the segments, and a high electrical resistance along an axis extending in the direction of movement of the brush over the segments and forming a high resistance shunt between the segments when the brush is in gap bridging position whereby sparking therebetween is reduced.

7. In an electrical motor having a rotatable commutator, said commutator having a plurality of insulated commutator segments of predetermined width separated by a gap of a width less than the width of a brush having a face in electrical engagement therewith, the improvement wherein said brush comprises a body of anisotropic graphite due to the crystalline structure thereof providing low electrical resistance along an axis perpendicular to the commutator-engaging face of the brush and a high electrical resistance along an axis extending from side to side in the direction of rotation, said brush providing a high resistance shunt when said brush is in gap bridging position.

8. In an electrical motor having a rotor provided with a plurality of coils connected to a commutator for rotation therewith, said commutator having a plurality of insulated commutator segments of predetermined width separated by a gap of a width less than the width of a brush having a face in electrical engagement therewith, the improvement wherein said brush comprises a body of anisotropic polycrystalline graphite having a highly-oriented crystal-lattice structure providing low electrical resistance along an axis perpendicular to the commutator-engaging face of the brush and a high electrical resistance along an axis extending from side to side in the direction of rotation in gap bridging direction, said brush providing a high resistance shunt in gap bridging position whereby sparking is reduced.

9. In an electrical motor having a rotor provided with a plurality of coils connected to a plurality of insulated segments of a commutator for rotation therewith, said commutator segments being of a predetermined width and separated by a gap of a width less than the width of a brush having a face in electrical engagement therewith, the improvement wherein said brush comprises a body of anisotropic polycrystalline graphite having a highly-oriented crystal-lattice structure providing low electrical and heat resistance along an axis perpendicular to the commutator-engaging face of the brush and along an axis extending from front to back of said brush and a high electrical and heat resistance along an axis extending from side to side in the direction of rotation in gap bridging direction.

References Cited in the file of this patent
UNITED STATES PATENTS

| | | |
|---|---|---|
| 1,556,990 | Henry | Oct. 13, 1925 |
| 1,734,811 | Kalb | Nov. 5, 1929 |